United States Patent Office 2,930,031
Patented Mar. 22, 1960

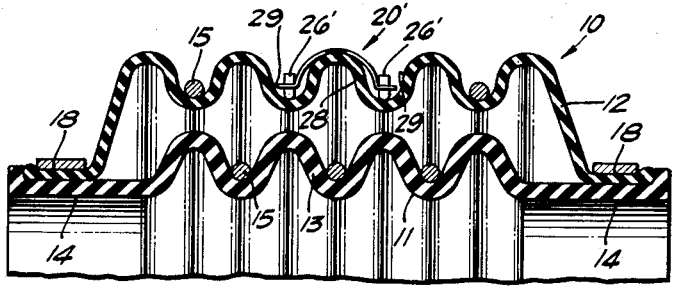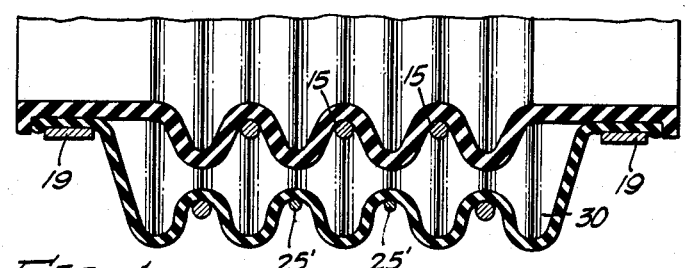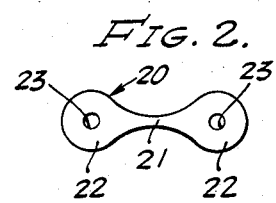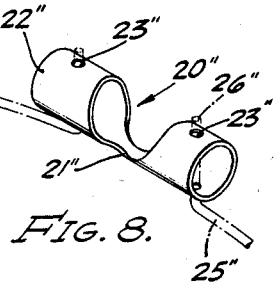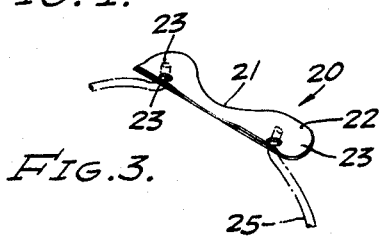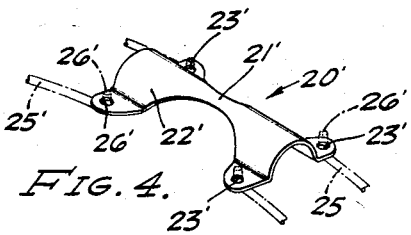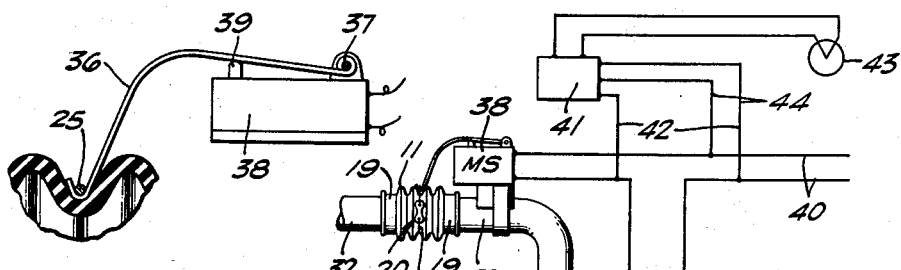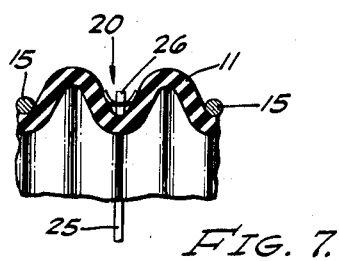

2,930,031

EXCESS PRESSURE INDICATOR AND SAFETY CONTROL CIRCUIT THEREFOR

Tibor Ungar, Brea, Calif., assignor by decree of distribution to Margaret Ungar

Application December 31, 1957, Serial No. 706,431

14 Claims. (Cl. 340—240)

The present invention relates to safety devices and more particularly to a novel indicator designed for detecting and indicating the existence of an excessive pressure condition within fluid circuits.

It is common practice in many diverse operations to employ flexible walled conduits and ducts in conveying pressurized fluid mediums and wherein the pressure may fluctuate over ranges in excess of the strength capabilities of the containing duct system. This is particularly true of hydraulic and pneumatic circuits in which abrupt changes in flow conditions may produce contemporary pressures in excess of the strength of the duct. Rupture of the duct when subjected to excessive pressures can be disastrous where the duct is employed as part of the hydraulic control, pressurization, or air conditioning system for an aircraft or where the medium set free is inflammable, toxic, explosive or exhibits other hazards of a like nature. Devices heretofore provided for measuring excessive pressure conditions, though operative, leave much to be desired and are not satisfactory for various reasons including the complexity thereof, their high cost, the space required for installation, the need for fluid connections and their unsuitability in many locations where excess pressure indication is a desirable or a necessary function.

The signaling system and pressure-sensitive indicator provided by the present invention obviates the shortcomings and disadvantages of prior devices. Basically, the indicator comprises a simple link of known strength and designed to rupture when the pressure within the conduit to which it is assembled exceeds a predetermined value. The link is adapted to be held assembled about the exterior of the flexible conduit being protected with the calibrated link forming a part of a supporting band encircling the duct. Accordingly, there is no need for fluid connections of any kind and the device is completely isolated from and out of contact with the fluid under pressure. The supporting band for the link has a length taken with that of the link itself such that an increase of the internal pressure within the system encircled beyond a known value is effective to rupture the link. The described indicator is intended to be used either alone or in combination with other devices to provide both a visual warning of the unsafe pressure conditions, as well as a safety cut-off discontinuing the flow of fluid through the duct until remedial action has been taken by a serviceman or an attendant.

Accordingly, it is a primary object of the present invention to provide a novel device for indicating the presence of a pressure conditions within a flexible conduit system in excess of a desired safe operating value.

Another object of the invention is the provision of a simple, inexpensive, thoroughly reliable and easily replaced excess pressure indicator suitable for use in connection with flexible walled fluid containers.

Another object of the invention is the provision of a calibrated failure link suitable for use in an excess pressure warning system for fluid containing and distributing circuits.

Another object of the invention is the provision of a safety device for duct systems designed for assembly quickly about the exterior of duct systems and operating to provide instant warning of unsafe pressure conditions within the system and replaceable quickly without need for interrupting the use of the system.

Another object of the invention is the provision of a safety cut-off system for fluid circuits operable to deactivate the circuit automatically upon the occurrence therein of pressure conditions in excess of a safe operating value.

More specifically it is an object of the invention to provide an excess pressure indicating device particularly adapted for use in connection with flexible couplings of the type used in connecting together parts of a fluid circuit.

These and other more specific objects will appear upon reading the following specification and claims and upon considering in connection therewith the drawing to which they relate.

Referring now to the drawing in which a preferred embodiment of the invention is illustrated:

Figure 1 is a longitudinal sectional view through a double walled flexible coupling having mounted about its exterior the excess pressure indicator device of the present invention;

Figure 2 is a plan view of one embodiment of the pressure indicator per se;

Figure 3 is a perspective view of the indicator link;

Figure 4 is a perspective view of a slightly different embodiment of the indicator link;

Figure 5 is a schematic view of the indicator device in a typical installation for automatically cutting off the flow of fluids when unsafe operating conditions arise and for simultaneously activating an alarm;

Figure 6 is a fragmentary enlarged view of the control switch and of its relationship to the support for the pressure indicator;

Figure 7 is a fragmentary view of the Figure 3 indicator assembled about a duct; and Figure 8 is a perspective view of another embodiment of the indicator link.

Referring first to Figure 1 there is shown a double walled or compound flexible coupling designated generally 10 of a type employed in joining the adjacent ends of conduits for a relatively high pressure fluid circuit and including an inner corrugated tubular coupling 11 and an outer corrugated coupling 12. It will be understood that couplings 11 and 12 may be formed of any suitable flexible material as for example, fiber glass fabric wrapped in known manner and bonded together with a suitable heat-cured elastomer, as for example, silicone compound and the like of which there are many suitable compounds well known to the art. Such couplings customarily comprise a central corrugated section 13 terminating in cylindrical sections 14 of a diameter which can be telescoped snugly over the ends of conduits being joined together and held sealed thereto by the usual clamping rings 19. Desirably, there are provided encircling rings 15 of metal seated in the exterior troughs of each corrugation (except where occupied by bands 25 described hereinbelow) and aiding materially in reinforcing the coupling and in maintaining the shape thereof particularly at bends and sharp turns while providing for longitudinal and radial relative movement of the cylindrical sections. Additionally, similar annular metal rings, not shown, may be seated in the interior troughs of the corrugations if desired, the latter serving to prevent inward collapse of the coupling under certain operating conditions.

The outer coupling 12 is formed similarly to inner coupling 11 but has sufficiently larger diameter as to telescope over inner coupling 11. It is provided at its opposite ends with reduced diameter cylindrical portions 18 having an internal diameter snugly fitting about the exterior surface of mounting sleeves 14 of the inner coupling. Due to the flexibility of the inner coupling, its opposite walls may be readily collapsed sufficiently to permit the assembly thereof within outer coupling 12. After the couplings have been nested as illustrated in Figure 1 and assembled over the ends of a rigid conduit, it will be understood that any suitable and well known type of clamping band can be inserted over the cylindrical portions 18, 18 and tightened to the extent necessary for rigidly sealing and clamping the couplings to the underlying ends of the fluid circuit.

The pressure indicator device forming an important part of this invention comprises a metal link 20 having the general configuration illustrated in Figures 2, 3 and 4. This link, conveniently stamped or otherwise formed from sheet metal stock, is provided with a central failure section 21 of reduced cross-sectional area such that when the link is placed under tension it is certain to fail by rupture of section 21. The enlarged opposite ends 22, 22 are provided with openings 23 to which a split ring type mounting band 25 may be attached. This band is conveniently formed from wire and has upturned ends 26 easily insertable through openings 23 of the failure link.

It is pointed out and emphasized that the length of mounting band 25 taken with the distance between mounting holes 23, 23 of the failure link are such that when snugly mounted to encircle a particular flexible duct, the reduced portion 21 of link 20 will be placed under tension when an internal pressure condition within the duct approaches an unsafe operating value for which the link is specifically calibrated. This value is easily determined since the duct or coupling normally expand only after the normal operating pressure has been exceeded and unsafe pressures have been reached. Accordingly, such expansion of the duct serves to stress the failure link with the result that the latter ruptures. Such rupture provides both visual indication and an audible indication of the unsafe condition.

The modified failure link designated generally 20' and illustrated in perspective in Figure 4 is particularly suitable for use with the compound coupling illustrated in Figure 1, it being understood that this link is curved both transversely thereof and longitudinally in a manner to seat and conform to the contour of the crest of central corrugation 28 of outer coupling 12. This mode of mounting the link requires the use of a pair of identical mounting rings 25' having hooked ends 26' extending through openings 23' arranged in pairs at either side of the enlarged ends 22' of the link. As is made clear by Figure 1, rings 25, 25 are seated snugly in the troughs of corrugations 29, 29 at either side of link 20' and cooperate in holding the link seated astride the crest of the intervening corrugation.

It will be understood that the concentrically arranged couplings 11 and 12, shown in Figure 1, are particularly suitable for use under high pressure conditions for which a single walled coupling would be unsafe or where a second coupling is a desirable safeguard should the primary coupling fail. The closed annular space 30 between the two couplings is charged with a fluid either at atmospheric or at some suitable intermediate pressure between that of the ambient atmospheric pressure and that within inner coupling 11. Under these circumstances any increase in the operating pressure within conduit 11 will cause the latter to expand. When this pressure becomes sufficiently excessive, conduit 11 will develop a leak or even rupture, filling conduit 12 with the pressurized fluid and causing the latter to expand. It will therefore be recognized that this expansion will cause link 20 to fail at the predetermined failure stress for which the link is calibrated.

It is pointed out and emphasized that under lower pressure operating conditions outer coupling 12 may be omitted. In this event, the failure link shown in Figure 2 is disposed in the trough of a corrugation in the manner generally indicated in Figure 6. In this mode of assembly, the failure device is substantially fully protected against damage by surrounding objects. As will be appreciated from the foregoing, the several failure links shown in Figures 2, 3 and 4 are similar in construction, purpose and mode of operation and each is adapted to be assembled about the exterior of flexible walled ducting and the like expeditiously and without need for tools.

Still another embodiment of the failure link is shown in Figure 8 wherein the same reference characters have been applied to designate the same parts as in the other embodiments but are distinguished by the use of a double prime. It will be recognized that the Figure 8 construction differs essentially in being formed from tubular stock, the central portion being cut or ground away to provide a calibrated failure section 21" of known strength. The tubular construction is suitable for use in the trough of a corrugation in the manner illustrated in Figure 7, and functions in the same way.

Referring now to Figure 5 there is shown a typical fluid system including a pair of rigid conduits 32, 33 flexibly interconnected by a coupling 11 in the manner described above. An electric motor 35 is coupled to drive a fluid pump 36' discharging fluid under pressure into pipe 33. A failure link 20 is mounted in one of the troughs of the corrugated coupling 11 in such manner as to overlie and hold depressed a lever 36 pivotally connected at 37 to a normally open microswitch 38 preferably rigidly secured to conduit 33 in any suitable manner. The failure link 20 and its supporting band 25 is effective to hold levers 36 depressed to hold switch button 39 depressed to close the switch. Switch 38 is arranged to control the power to motor 35 from a suitable power source 40, this power source being separately controlled if desired by a manual or automatic switch, not shown. So long as safe pressure conditions exist within ducts 32 and 33 and within flexible coupling 11, switch 38 will be held closed. However, should the pressure exceed a safe operating value for which failure link 20 has been designed, coupling 11 will expand sufficiently to rupture the calibrated failure section 21 of the link allowing the spring biased switch 38 to pivot lever 36 outwardly about pivot 37 opening the power circuit 40 to the motor.

If either or both a visual or inaudible signal is desired to activate an alarm simultaneously with the opening of switch 38, circuit 40 may be provided with a relay 41 operable, so long as energized through leads 42, to hold a circuit to the light or audible signal 43 open. However, upon the failure of link 20, the motor circuit is de-energized with the result that relay 41 operates to complete a circuit to the alarm device 43 thereby notifying the operator of the unsafe operating conditions and the fact that the supply of fluid to circuit 32, 33 has been discontinued.

The mode of operation of the safety and pressure-sensitive device described above will be quite apparent from the foregoing detailed description of its structure and mode of assembly about flexible conduits handling fluids under pressure. It is specifically pointed out that the calibrated link per se is formed from any suitable homogeneous material having a known strength for a given cross-sectional area. Accordingly, it will be understood that the failure links of widely varying but accurately known failure strengths may be formed using the same stamping dyes by the simple expedient of substituting sheet material of different thicknesses depending upon the particular failure strength desired. The safety device is easily installed by snapping the split ring mounting band 25 about a flexible conduit and compressing the ends inwardly sufficiently for the hooked ends 26 to fit through counting openings 23 at the opposite ends of the link 20. Thereafter the normal resiliency of the supporting duct, taken with the resiliency of the supporting band 25, holds the assembly firmly in place. Should the internal pressure within the duct or coupling on which the device is mounted exceed a value to strain the wall excessively, the calibrated mid-section 21 of the link fails at predetermined stress indicative of a particular internal pressure within the conduit.

When applied to couplings of a corrugated type it is desirable wherever feasible to mount the stress indicator in the trough of a corrugation where it is protected from external objects. In some cases couplings having but a single corrugation are used and in this case, or even when using multiple corrugation ducting, it may be desirable to mount the device as illustrated in Figure 1 astride the exterior crest of a corrugation with its supporting bands seated in the troughs to either side thereof.

Where it is desirable to provide an indication of unsafe conditions in addition to the rupture of the indicator, resort may be had to the safety control circuit and alarm system of which the circuit shown in Figure 5 is illustrated. In this case, use is made of the pressure indicator to hold a switch closed controlling the flow of fluid through the fluid circuit. It will, of course, be appreciated that switch 38 may control a relay for the main power circuit to the motor valve or other device controlling the flow of fluid, but irrespective of the circuit connections used it will be understood that the opening of switch 38 is effective to provide a suitable alarm signal and may be employed additionally to close off the flow of fluid.

While the particular excess pressure indicator and control circuit therefor herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An excess pressure indicator for use on flexible duct comprising a link having a section of reduced cross-sectional area adapted to rupture when the link is subjected to tension in excess of a predetermined value, and means for supporting said link in close contact with the exterior surface of a flexible duct whereby the expansion thereof when subjected to excessive internal pressure will cause the same to expand and rupture said link and provide a warning of unsafe operating conditions.

2. An excess pressure indicator adapted for use on flexible duct, said indicator comprising an elongated member of homogeneous material having a reduced section between its opposite ends of accurately determined cross-sectional area and having a known tensile rupture strength and adapted to be supported between the ends of a much higher strength band, said band having a length taken with that of said link to embrace closely the exterior circumference of flexible duct.

3. An excess pressure indicator as defined in claim 2 characterized in the provision of openings in its opposite ends adapted to receive and seat the hooked ends of a band adapted to support said link about the circumference of flexible duct.

4. In combination with a fluid conveying conduit formed at least in part of flexible duct which expands under pressure, power driven means for controlling the flow of pressurized fluid through said duct and characterized in the provision of means for de-energizing said power driven means automatically upon the fluid pressure in said duct exceeding a predetermined value, said last mentioned means including a calibrated failure link encircling said duct and effective upon rupture thereof following excessive pressure conditions to discontinue the operation of said power driven means.

5. The combination defined in claim 4 characterized in that said means for de-energizing said power driven means includes an electric switch biased to a first position to de-energize said power driven means and arranged to be held in a second position for rendering said power driven means operative, said failure link being effective to hold said switch in said second position until said link ruptures leaving said switch free to move to said first position.

6. A safety device for use on flexible duct including an excess pressure indicator, said indicator comprising a calibrated link adapted to encircle duct closely and to be tensioned as the duct expands under internal pressure, signal means operatively associated with said link and held deactivated so long as said link remains intact, said signal means being rendered automatically active upon the failure of said link to signal an excess pressure condition in the duct.

7. A safety device as defined in claim 6 including means for supplying fluid under pressure through the duct provided with said excess pressure indicator, and means normally held inactive by said indicator and operable upon failure thereof to deactivate said fluid supply means for said duct.

8. An excess pressure indicator link adapted for use in determining excess pressure conditions in duct and the like, said link comprising a thin elongated strip of homogeneous material having relatively large opposite ends adapted to be detachably connected between the ends of a split ring, said strip having a reduced mid-portion of accurately predetermined strength adapted to rupture when the tension applied to said strip exceeds such strength.

9. An excess pressure indicator as defined in claim 8 characterized in that said strip is curved crosswise thereof and adapted to conform to the circumferential contour of corrugated flexible duct for use with which it is designed.

10. An excess pressure indicator as defined in claim 8 characterized in that said strip is shaped to conform to the corrugated surface of flexible duct and to be placed under lengthwise tension as the ducting expands under internal pressure.

11. An article of manufacture adapted for use in providing an indication of excess pressure conditions interiorly of flexible duct, said article comprising a link of metal having a reduced mid-portion of accurately predetermined rupture strength, and a mounting ring for use in supporting the same closely against the exterior circumference of said duct, said ring being split and having hooked ends adapted to seat within openings therefor at the opposite ends of said link.

12. In combination, a flexible coupling for use in fluid conveying conduits, said coupling comprising a length of circumferentially corrugated flexible duct, reinforcing rings seated in the external troughs of at least certain of said corrugations, and a stress indicator seated in at least one of said troughs, said indicator including a link of calibrated strength adapted to rupture when the internal pressure of said coupling increases to expand said coupling to stress said link beyond the strength thereof.

13. In combination, a flexible coupling for use in fluid conveying conduits, said coupling comprising a length of circumferentially corrugated flexible duct, reinforcing rings seated in the external troughs of said corrugations, and a stress indicator extending circumferentially of one of said corrugations and adapted to be held in place thereon by band means encircling said coupling and attached to the opposite ends of said link, said link having a reduced mid-portion of known tensile strength whereby the expansion of said coupling in response to internal pressure is effective to rupture said link to indicate thereby the existence of a certain internal pressure within said coupling.

14. The combination defined in claim 13 wherein said link curved crosswise and lengthwise thereof to lie along the exterior crest of a corrugation and wherein a pair of split rings located on the opposite sides of said corrugation crest with their ends connected to the opposite ends of said link.

References Cited in the file of this patent
UNITED STATES PATENTS

| | | |
|---|---|---|
| 973,033 | Gough | Oct. 18, 1910 |
| 1,219,723 | Gracey et al. | Mar. 20, 1917 |
| 2,027,068 | Siddal | Jan. 7, 1936 |

UNITED STATES PATENT OFFICE
CERTIFICATE OF CORRECTION

Patent No. 2,930,031                                                     March 22, 1960

Tibor Ungar

It is hereby certified that error appears in the printed specification of the above numbered patent requiring correction and that the said Letters Patent should read as corrected below.

Column 3, lines 61 and 62, for "sec-ond" read -- secondary --; column 4, line 49, for "inaudible" read -- audible --; column 5, line 1, for "counting" read -- mounting --.

Signed and sealed this 4th day of April 1961.

(SEAL)
Attest:    ERNEST W. SWIDER

Attesting Officer                                    ARTHUR W. CROCKER
                                                                         Acting Commissioner of Patents